United States Patent
Worrell (10) Patent No.: US 6,671,781 B1
(45) Date of Patent: Dec. 30, 2003

(54) DATA CACHE STORE BUFFER

(75) Inventor: Frank Worrell, San Jose, CA (US)

(73) Assignee: LSI Logic Corporation, Milpitas, CA (US)

(*) Notice: Subject to any disclaimer, the term of this patent is extended or adjusted under 35 U.S.C. 154(b) by 360 days.

(21) Appl. No.: 09/732,946

(22) Filed: Dec. 8, 2000

(51) Int. Cl.[7] .............................................. G06F 12/08
(52) U.S. Cl. ...................................................... 711/138
(58) Field of Search ................................ 711/118, 138

(56) References Cited

U.S. PATENT DOCUMENTS

| | | | | |
|---|---|---|---|---|
| 5,228,135 A | * | 7/1993 | Ikumi | 395/425 |
| 5,283,890 A | * | 2/1994 | Petolino, Jr. et al. | 395/425 |
| 5,317,718 A | * | 5/1994 | Jouppi | 395/425 |
| 5,564,034 A | * | 10/1996 | Miyake | 395/455 |

* cited by examiner

Primary Examiner—Kevin L. Ellis
(74) Attorney, Agent, or Firm—Christopher P. Mairoana, PC (57) ABSTRACT

A circuit comprising a cache memory, a memory management unit and a logic circuit. The cache memory may be configured as a plurality of associative sets. The memory management unit may be configured to determine a data tag from an address of a data item. The logic circuit may be configured to (i) determine a selected set from the plurality of associative sets that produces a cache-hit for the data tag, (ii) buffer the address and the data item during a cycle, and (iii) present the data item to the cache memory for storing in the selected set during a subsequent cycle.

20 Claims, 5 Drawing Sheets

DATA CACHE STORE BUFFER

FIELD OF THE INVENTION

The present invention relates to a method and/or architecture for pipelined processors and, more particularly, to a method and/or architecture for reading from and writing to a cache memory.

BACKGROUND OF THE INVENTION

In a pipelined central processing unit (CPU), it is highly desirable that all operations for a data cache memory be performed in the same pipeline stage. This allows loads and stores to flow in the pipeline without losing performance due to resource contention. It is also highly desirable to use synchronous (i.e., clocked) random access memory (RAM) in the cache memory to avoid problems associated with asynchronous RAMS. The combination of synchronous RAMS and a pipelined CPU results in two timing problems that need to be solved.

The first problem is a write data timing problem. Ideally, write data items should be transferred at the same point in the pipeline as read data items. In synchronous RAMS, read data items become valid within a propagation time delay after the RAM is clocked. However, write data items and write enable signals must be stable during a set-up time before the RAM is clocked.

The second problem is a write enable timing problem. There are several reasons why timing of a write enable signal needs to be one cycle later than the natural timing before the clock for synchronous RAMS. In systems where all or a part of a physical address is used as a data tag in the cache memory, a memory management unit operation must be performed during a cache write operation to convert a virtual address into the physical address. This conversion should be performed in parallel with a tag RAM access so that the data tag and a stored tag can be compared. When the memory management unit (MMU) flags an MMU exception, stores to the cache memory must be inhibited. Furthermore, in two or more way set associative cache memories, access to the tag RAM is required to determine which associative set of the cache memory should receive the write data. Only the associative set that produces a cache-hit, if any, should receive the write data.

It would be desirable to implement a mechanism and method of operation for a cache memory design to handle write data items and write enables one cycle later than the natural timing of synchronous RAMS.

SUMMARY OF THE INVENTION

The present invention concerns a circuit comprising a cache memory, a memory management unit and a logic circuit. The cache memory may be configured as a plurality of associative sets. The memory management unit may be configured to determine a data tag for an address of a data item. The logic circuit may be configured to (i) determine a selected set from the plurality of associative sets that produces a cache-hit for the data tag, (ii) buffer the address and the data item during a cycle, and (iii) present the data item to the cache memory for storing in the selected set during a subsequent cycle.

The objects, features and advantages of the present invention include providing a method and architecture for a cache memory buffering mechanism that may (i) simplify timing contentions between write set-up timing requirements and read propagation delay requirements; (ii) present a data item in the memory stage of a pipelined processor after initiating a load operation to cache memory for that data item within the memory stage; (iii) accommodate back-to-back store operations to the cache memory without delaying or stalling a pipeline by sequentially buffering both store operations outside the cache memory; and/or (iv) accommodate back-to-back store operations to the cache memory without delaying or stalling the pipeline by buffering only the second store operation outside the cache memory.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
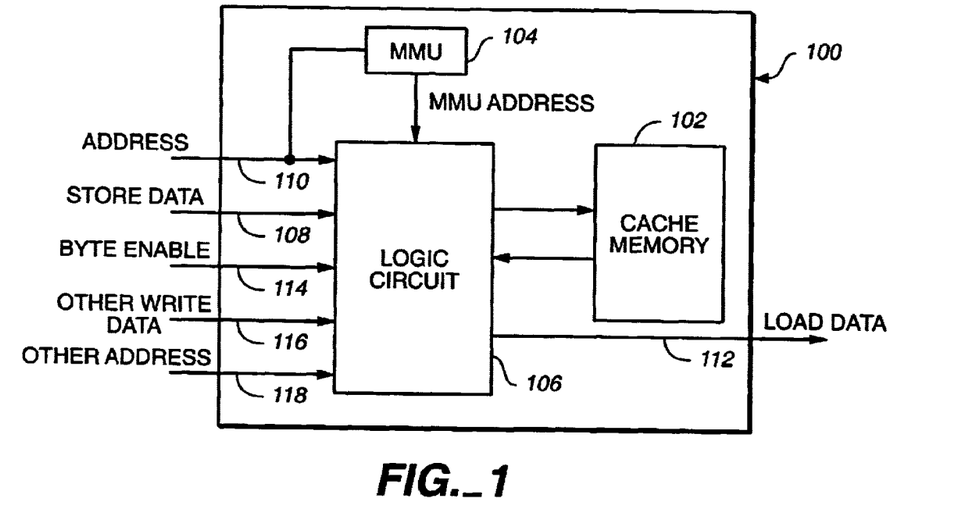
FIG. 1 is a block diagram of an example embodiment of the present invention.

FIG. 1 is a block diagram of a circuit 100 in accordance with a preferred embodiment of the present invention. The circuit 100 may include a cache memory 102, a memory management unit (MMU) 104, and a logic circuit 106 for controlling and storing data items. The term "data item" may be used in a generic sense in this document. A data item may include, but is not limited to information, control, data, signal, trigger, value, parameter, operator, operand, address, and the like.

An input data item (e.g., STORE DATA) may be presented to an input 108 of the circuit 100. The data item STORE DATA generally conveys information that is to be stored in the cache memory 102. The data item STORE DATA may be implemented as one or more bytes of digital data. Another input data item (e.g., ADDRESS) may be presented to an input 110 of the circuit 100. The data item ADDRESS is generally an address that identifies where the data item STORE DATA is to be stored. The data item ADDRESS may be implemented as a virtual address or a physical address. An output data item (e.g., LOAD DATA) may be presented at an output 112 of the circuit 100. The data item LOAD DATA generally conveys information read from the cache memory 102. The data item LOAD DATA may be implemented as one or more bytes of digital data.

Another input data item (e.g., BYTE ENABLE) may be provided at an input 114 of the circuit 100. The data item BYTE ENABLE may identify which bytes of the data item STORE DATA contain valid information. The data item BYTE ENABLE may be implemented as a single bit for each byte of the data item STORE DATA. When a given bit of the data item BYTE ENABLE is in a valid state, then the corresponding byte of the data item STORE DATA contains valid data to be stored in the cache memory 102. When the given bit of the data item BYTE ENABLE is in an invalid state, then the corresponding byte of the data item STORE DATA should not be stored in the cache memory 102.

An input data item (e.g., OTHER WRITE DATA) may be provided at an input 116 of the circuit 100. The data item OTHER WRITE DATA may convey other information that may be stored in the cache memory 102. The data item OTHER WRITE DATA may be implemented as one or more bytes of digital information. Another input data item (e.g., OTHER ADDRESS) may be provided at an input 118 of the circuit 100. The data item OTHER ADDRESS is generally an address that identifies where the data item OTHER WRITE DATA is to be stored. The data item OTHER ADDRESS may be implemented as a virtual address or a physical address.

The cache memory 102 is generally configured to store the data item STORE DATA and the data item OTHER WRITE DATA. The cache memory 102 may be implemented, in one example, as a synchronous type random access memory (RAM) arranged as N-way set associative, where N is an integer greater than or equal to two. The cache memory 102 generally, although not necessarily, comprises static RAMS. These static RAMS include, but are not limited to four and six transistor cells.

The memory management unit 104 may translate the data item ADDRESS into another data item (e.g., MMU ADDRESS). The data item MMU ADDRESS is generally implemented as a physical address associated with the data item STORE DATA. A portion of the data item MMU ADDRESS may also be used as another data item (e.g., DATA TAG). The data item DATA TAG is generally used to identify which set of the multiple associative sets produces a cache-hit for the data item STORE DATA during a write, and the data item LOAD DATA during a read.

A logic circuit 106 may provide store and load control functions for writing to and reading from the cache memory 102. A load operation normally involves reading selected data from the cache memory 102 and presenting (or outputting) the selected data at the output 112 as the data item LOAD DATA. The data item ADDRESS generally determines the data being read. The logic circuit 106 may also allow the data item STORE DATA to be presented as the data item LOAD DATA. Consequently, the input data item STORE DATA may be presented as the output data item LOAD DATA before or as the data item STORE DATA is written into the cache memory 102.

A basic store operation generally involves a two-step process for writing the data item STORE DATA into the cache memory 102. In the first step, the memory management unit 104 translates the data item ADDRESS into the data item MMU ADDRESS at the beginning of a memory-stage cycle. A portion of the data item MMU ADDRESS may be used as the data item DATA TAG. Meanwhile, the logic circuit 106 may access other data items (e.g., CACHE TAGS) in the cache memory 102. Near the end of the memory-stage cycle, the data item ADDRESS and the data item STORE DATA are buffered into the logic circuit 106. The logic circuit 106 generally determines if there is a match (e.g., a cache-hit) between the data item DATA TAG and data items CACHE TAGS.

Figure 2:
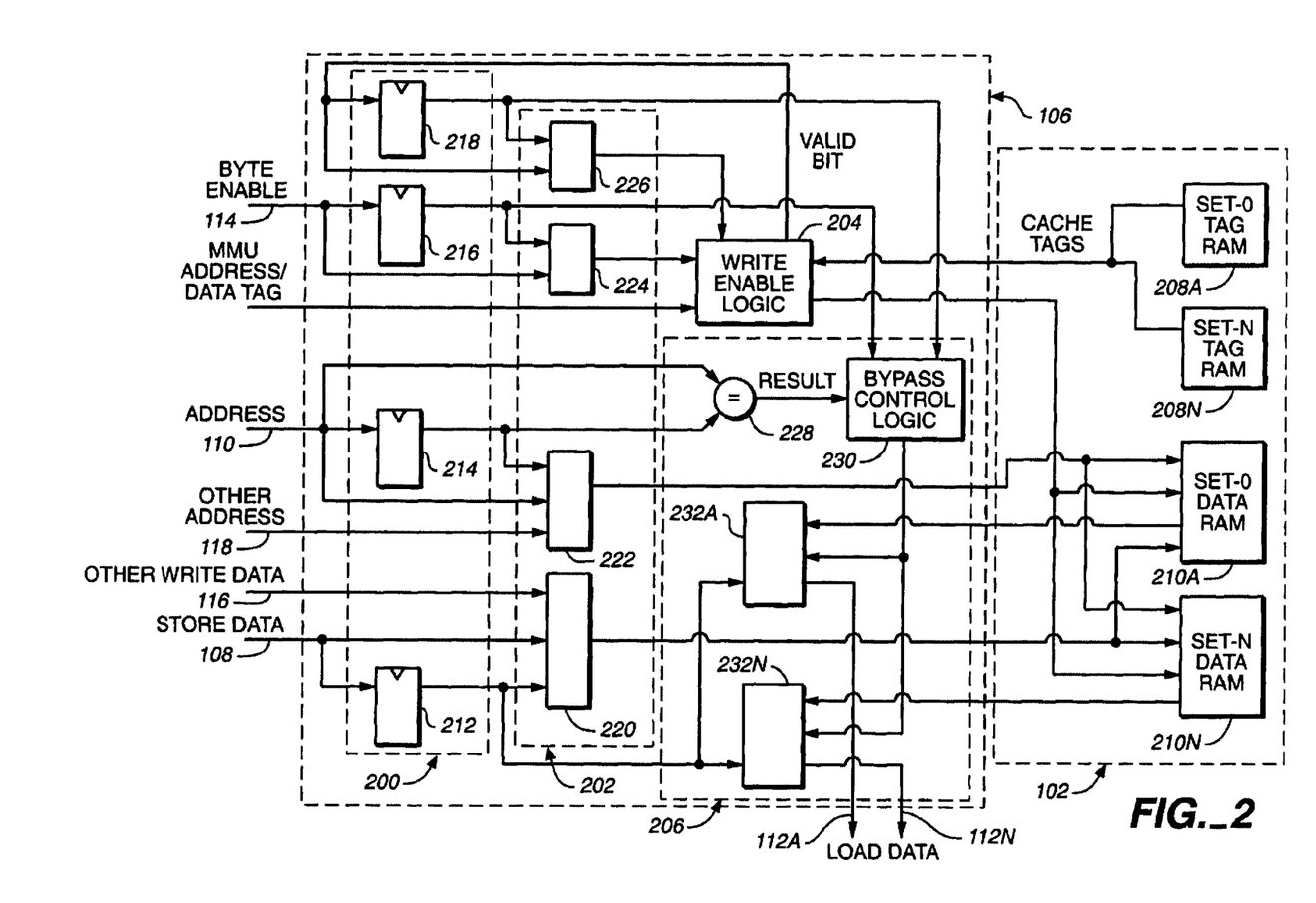
FIG. 2 is a detailed block diagram of a portion of FIG. 1.

Referring to FIG. 2, a block diagram of the logic circuit 106 and cache memory. 102 is shown. The logic circuit 106 generally comprises a store buffer 200, a bypass multiplexer 202, a write enable logic 204 and a read logic 206. The cache memory 102 includes two or more tag RAMs 208A-N and two or more sets of data RAMs 210A–N.

The store buffer 200 generally includes multiple registers. A data register 212 may buffer the data item STORE DATA. In the preferred embodiment, the data register 212 is sixty-four (64) bits wide. Other widths for the data register 212 may be implemented to meet the design criteria of a particular application.

An address register 214 may. be provided to buffer the data item ADDRESS. In a preferred embodiment, the address register 214 has a width chosen to store the entire data item ADDRESS width. In an alternative embodiment, the address register 214 may have a width equal to an index address used with the associative sets of the cache memory 102. Consequently, the address register 214 may store only a portion of the data item ADDRESS.

A byte enable register 216 may be provided to store the data item BYTE ENABLE. The byte enable register 216 has one symbol per unit width of the data register 212. In a preferred embodiment, the byte enable register 216 may be implemented as one bit in width per byte width of the data register 212. The data item BYTE ENABLE generally indicates if a full width or some partial width of the data item STORE DATA is being stored into the cache memory 102. Relationships other than one bit per byte may be provided between the byte enable register 216 and the data register 212. For example, the byte enable register 216 may have one bit per sixteen bit half-word of the data register 212.

A valid bit register 218 may be provided to identify which associative set in the cache memory 102 is to receive the data item STORE DATA buffered in the data register 212. The valid bit register 218 generally buffers a data item (e.g., VALID BIT) that has one symbol per associative set. In a preferred embodiment, the data item VALID BIT and valid bit register 218 may be implemented as one bit per associative set. For example, a circuit 100 having a two-way set associative cache memory 102 would require a two bit wide valid bit register 218. The contents of the valid bit register 218 and the byte enable register 216 are provided to the write enable logic 204 that controls writes to the data RAMs 210A–N of the cache memory 102.

The bypass multiplexer 202 may be optional to the logic circuit 106. When included, the bypass multiplexer 202 generally includes one multiplexer per register in the store buffer 200. In other words, the bypass multiplexer may comprise a data multiplexer 220 connected to the data register 212, an address multiplexer 222 connected to the address register 214, a byte enable multiplexer 224 connected to the byte enable register 216, and a valid bit multiplexer 226 connected to the valid bit register 218. The multiplexers 220–226 may allow the registers 212–218 in the store buffer 200 to be bypassed. The bypass capability may be useful for dealing with consecutive back-to-back store operations, as will be described later.

The data multiplexer 220 generally provides a capability to direct a first data item STORE DATA buffered in the data register 212, a second data item STORE DATA received at the input 108, or the data item OTHER WRITE DATA to the cache memory 102. The address multiplexer 222 may provide a capability to direct a first data item ADDRESS buffered in the address register 214, a second data item ADDRESS received at the input 110, or the data item OTHER ADDRESS to the cache memory 102. The byte enable multiplexer 224 may provide a capability to direct a first data item BYTE ENABLE buffered in the byte enable register 216 or a second data item BYTE ENABLE received at the input 114 to the write enable logic 204. The valid bit multiplexer 226 may provide a capability to direct a first data item VALID BIT buffered in the valid bit register 218 or a second data item VALID BIT as determined by the write enable logic 204 back to the write enable logic 204.

The write enable logic 204 provides general control for writing or storing the data item STORE DATA and the data item OTHER WRITE DATA into the cache memory 102.

The write enable logic 204 generally uses the data item MMU ADDRESS received from the memory management unit 104 and the data items CACHE TAGS received from the cache memory 102 to determine a cache-hit or cache-miss responsive to a load or store operation. The data item VALID BIT and the data item BYTE ENABLE may also be presented to the write enable logic 204 allowing the write enable logic 204 to determine which set of the data RAMs 210A–N is being accessed, as well as the width of the data being written.

The read logic 206 may provide general control for reading or loading data from the cache memory 102 for presentation external to the circuit 100. The read logic 206 may include an address comparator 228, a bypass control logic 230, and multiple read multiplexers 232A–N. The address comparator 228 generally compares the data item ADDRESS buffered in the address register 214 with the data item ADDRESS present at input 110. The address comparator 228 presents a data item (e.g., RESULT) to the bypass control logic 230. The data item RESULT may indicate a hit or miss for the buffered data item ADDRESS with respect to the data item ADDRESS. The bypass control logic 230 uses the data item RESULT to control the read multiplexers 232A–N. The read multiplexers 232A–N may present data from the cache memory 102 or from the data register 212 as the output data item LOAD DATA. When the data item STORE DATA buffered in the data register 212 is presented as the data item LOAD DATA, then the bypass control logic 230 uses the data item VALID BIT and the data item BYTE ENABLE to control which of read multiplexer 232A–N presents the data item LOAD DATA. The output 112 may have a unique physical output 112A–N for each data RAM 210A–N of the cache memory 102.

Figure 3:
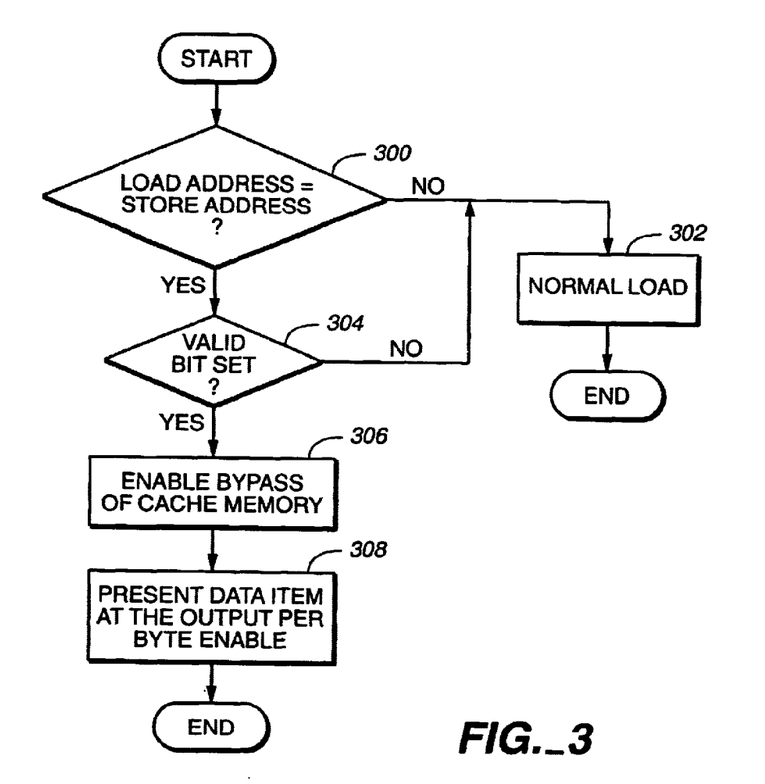
FIG. 3 is a flow diagram of a load method.

Referring to FIG. 3, a flow diagram for a load operation is presented. In a preferred embodiment, all cache load and store operations are performed in the same pipeline stage of a processor implementing the present invention. In particular, the cache load and store operations may be performed in a memory-stage. Generally, the desired data may be read directly from the data RAMs 210A–N of the cache memory 102 for loading into other registers (not shown) external to the circuit 100. The read logic 206 may handle load operations where the desired data is in the store buffer 200 but not yet committed to the cache memory 102.

If the address comparator 228 detects that the data item ADDRESS for the load operation (LOAD ADDRESS) does not match the data item ADDRESS in the store buffer 200 (STORE ADDRESS) (e.g., the NO branch of decision block 300), then the bypass control logic 230 controls the read multiplexers 232A–N to allow for a normal load operation from the cache memory 102 (e.g., block 302). If the address comparator 228 detects that the data item ADDRESS matches the data item ADDRESS in the store buffer 200 (e.g., the YES branch of decision block 300), then the bypass control logic 230 may check the status of the data item VALID BIT (e.g., decision block 304). If none of the bits in the data item VALID BIT are set to the valid state (e.g., the NO branch of decision block 304), then the normal load operation may be performed.

If there are one or more bits of the data item VALID BIT set to the valid state (e.g., the YES branch of decision block 304), then the bypass control logic 230 may control the read multiplexers 232A–N to select the data item STORE DATA from the store buffer 200 (e.g., block 306). Here, the cache memory 102 has been bypassed. Only that portion of the data item STORE DATA as indicated by the data item BYTE ENABLE may be presented as the output data item LOAD DATA, as shown in block 308.

Figure 4:
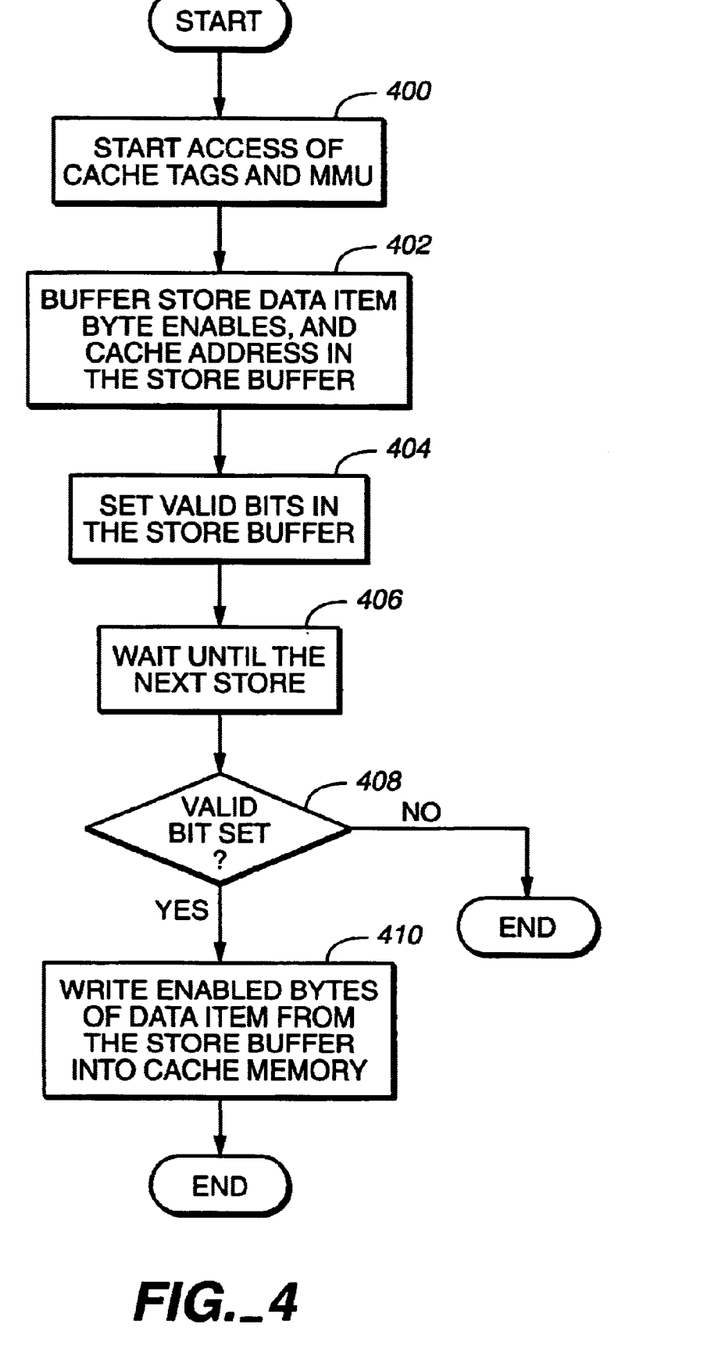
FIG. 4 is a flow diagram of a store method.

Referring to FIG. 4, basic store operations are split into a sequence of buffering data in the store buffer 200 and then committing the data to the cache memory 102. The store operation begins when a store request is received by the circuit 100. The circuit 100 may respond at a clock edge at the beginning of a memory-stage cycle by starting to access the data items CACHE TAGS from the cache memory 102 and the data item MMU ADDRESS from the memory management unit 104 (e.g., block 400). The data item ADDRESS may be used in part as a cache address for the cache memory 102.

On a clock edge at the end of the memory-stage cycle, the data item STORE DATA, the data item ADDRESS, and the data item BYTE ENABLE may be loaded into the store buffer 200 (e.g., block 402). When the write enable logic 204 has finished determining if there is a cache-hit or MMU exception, then the appropriate bits may be set in the data item VALID BIT buffered in the store buffer 200 (e.g., block 404).

The data items STORE DATA and associated data items ADDRESS, BYTE ENABLE, and VALID BIT are stored in the circuit 100 by the end of the memory-stage cycle. In a preferred embodiment, the data item STORE DATA may be committed to the cache memory 102 upon the next store instruction. In an alternative embodiment, the data item STORE DATA may be committed to the cache memory 102 on the next available instruction that does not require a load operation from the cache memory 102. On a clock edge of a subsequent memory-state cycle the data item VALID BIT is checked (e.g., decision block 408). If no bits are set in the valid state (e.g., the NO branch of decision block 408), then there has been a cache-miss or some other exception that prevents the data item STORE DATA from being written into the cache memory 102. If one bit of the data item VALID BIT is set to the valid state, then the data item STORE DATA may be committed to the cache memory 102 (e.g., block 410).

The present invention may accommodate back-to-back store operations in different ways. A first method for handling back-to-back store operations may be to accomplish each consecutive store operation through the store buffer 200. A second method for handling back-to-back store operations may be to bypass the store buffer 200 for all store operations except for the last store operation.

Figure 5:
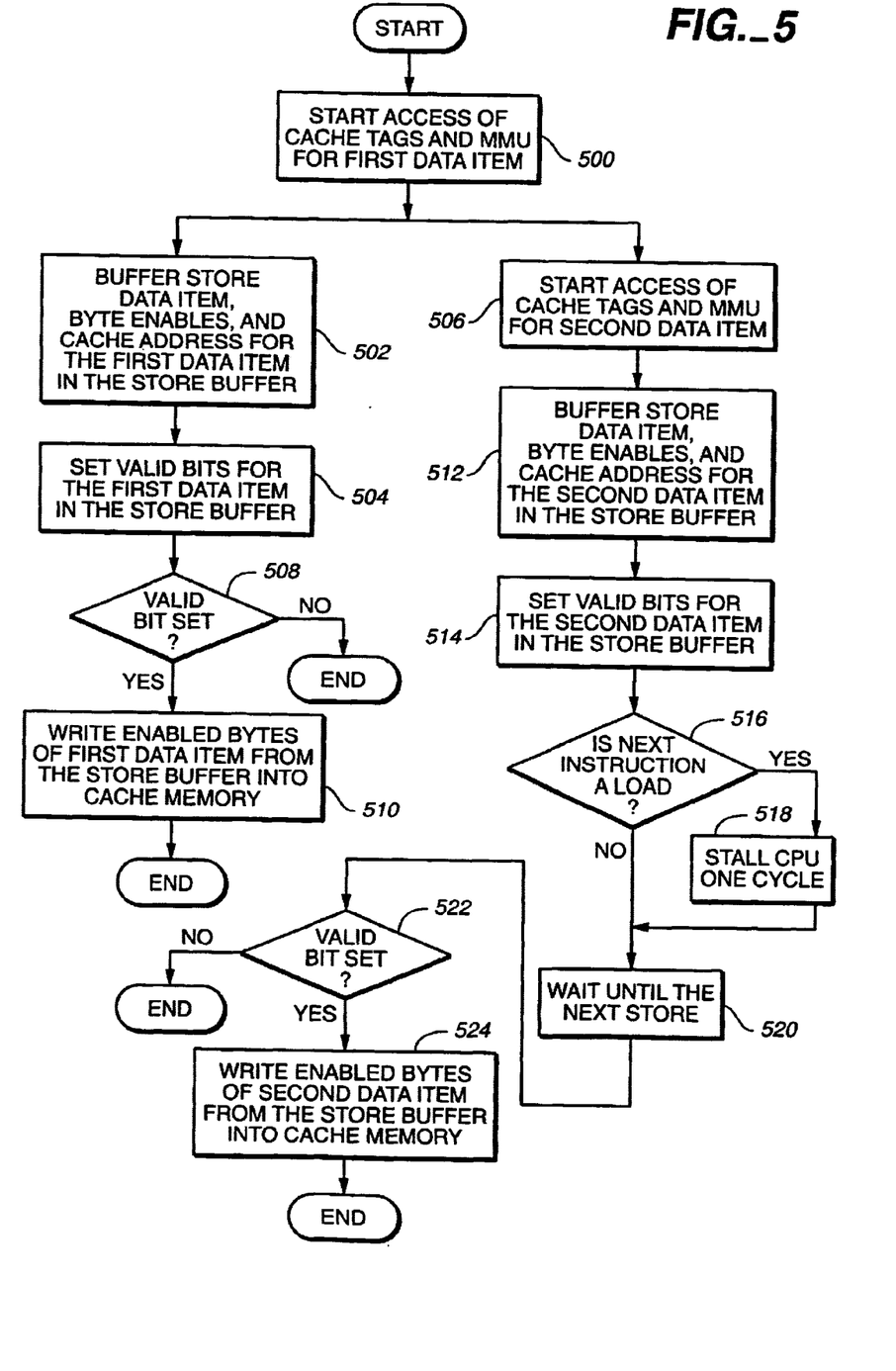
FIG. 5 is a flow diagram of a first back-to-back store system method.

Referring to FIGS. 5A, and 5B a first method for accommodating back-to-back store operations through the store buffer 200 is shown. The method begins at a clock edge of a first memory-stage cycle with an access of a first data item CACHE TAGS from the cache memory 102 and a first data item MMU ADDRESS from the memory management unit 104 for a first data item STORE DATA (e.g., block 500). At a clock edge at the end of the first memory-stage cycle/ beginning of a second memory-stage cycle, the first data item STORE DATA, the first data item ADDRESS, and the first data item BYTE ENABLE are buffered in the store buffer 200 (e.g., block 502). A first data item VALID BIT associated with the first data item STORE DATA may be set in the store buffer 200 when available (e.g., block 504). Meanwhile, an access of a second data item CACHE TAGS and a second data item MMU ADDRESS for a second data item STORE DATA may be initiated at the clock edge at the beginning of the second memory-stage cycle (e.g., block 506). Here, the first data items STORE DATA and the second data item STORE DATA are being processed substantially simultaneously.

At a clock edge at the end of the second memory-stage cycle, the first data item VALID BIT may be checked (e.g., decision block 508). If no bits of the first data item VALID BIT are set to the valid state (e.g., the NO branch of decision block 508), then the data item STORE DATA may not be committed to the cache memory 102. If one bit of the first data item VALID BIT is set to the valid state (e.g., the YES branch of decision block 508), then the first data item STORE DATA may be committed to the cache memory 102 (e.g., block 510).

At the clock edge at the end of the second memory-stage cycle, the second data item STORE DATA, the second data item ADDRESS, and the second data item BYTE ENABLE may also be stored in the store buffer 200 (e.g., block 512). A second data item VALID BIT associated with the second data item STORE DATA may be set in the store buffer 200 when available (e.g., block 514).

If the next instruction after the second store instruction is a load instruction (e.g., the YES branch of decision block 516), then a stall is performed (e.g., block 518) for one cycle to allow the first data item STORE DATA to finish writing to the cache memory 102. If the next instruction is not a load instruction (e.g., the NO branch of decision block 516), then the second data item STORE DATA, the second data item ADDRESS, the second data item BYTE ENABLE, and the second data item VALID BIT are held in the store buffer 200 until the next store instruction (e.g., block 520).

The next store instruction may appear immediately after the second store instruction or at a later time. When the next (third) store instruction is executed a subsequent (third) memory-stage cycle may occur. At a clock edge of the subsequent memory-stage cycle the second data item VALID BIT is checked (e.g., decision block 522). If all of the bits of the second data item VALID BIT are in the invalid state (e.g., the NO branch of decision block 522), then the second data item STORE DATA may not be committed to the cache memory 102. If one bit of the second data item VALID BIT is in the valid state (e.g., the YES branch of decision block 522), then the second data item STORE DATA may be written to the cache memory 102 (e.g., block 524). The above-described method may be repeated for additional back-to-back data items STORE DATA with each new data item STORE DATA being first loaded into the store buffer 200 while an earlier data item STORE DATA is simultaneously committed to the cache memory 102.

Figure 6:
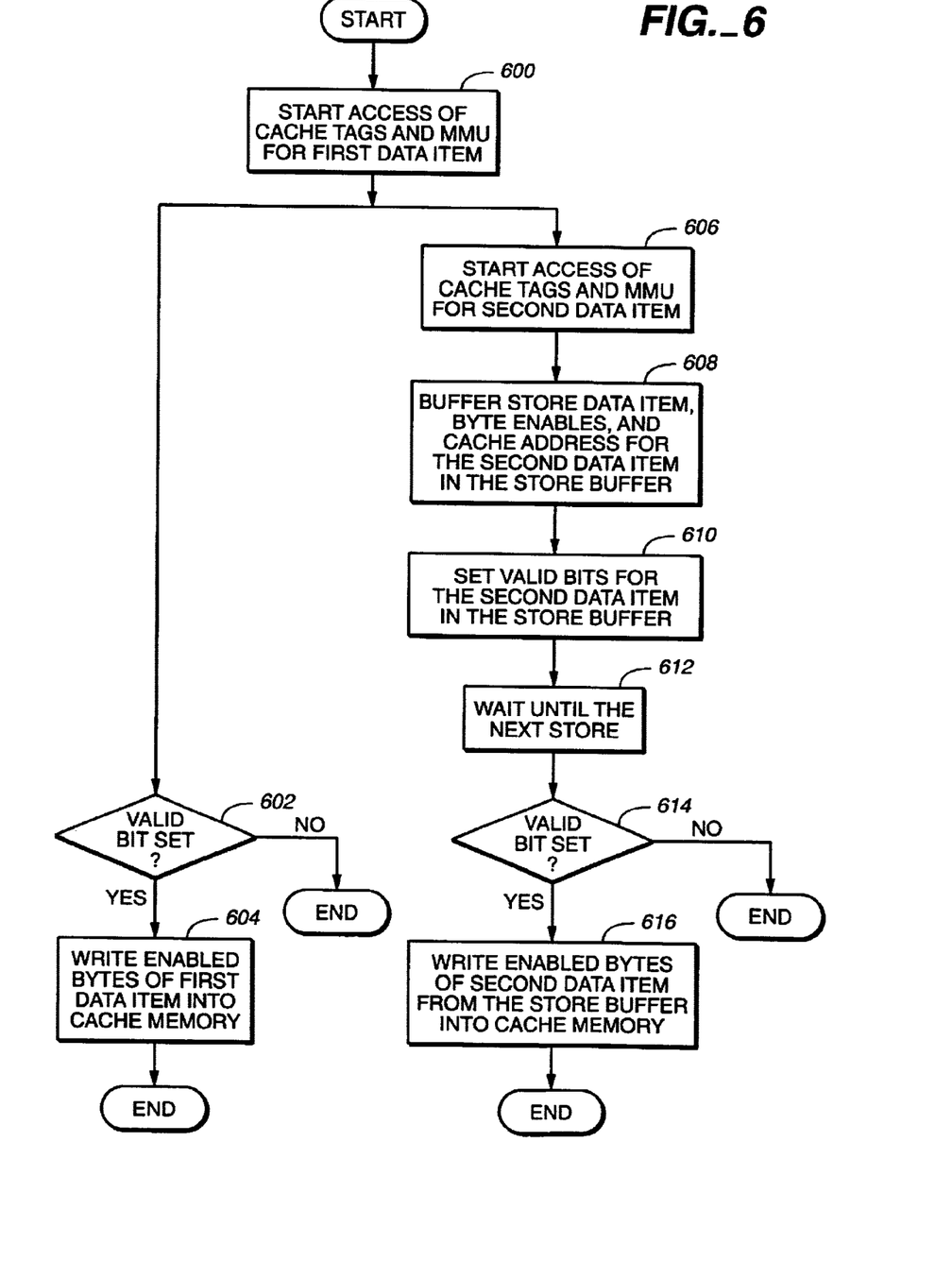
FIG. 6 is a flow diagram of a second back-to-back store method.

FIG. 6 is a flow diagram of a second method for handling back-to-back store operations. This method generally requires the presence of the bypass multiplexer 202. Here, the method begins with a clock edge of a first memory-stage cycle by starting access of the first data item CACHE TAGS from the cache memory 102 and the first data item MMU ADDRESS from the memory management unit 104 (e.g., block 600). While the cache memory 102 and memory management units 104 are being accessed, the bypass multiplexer 202 may present the first data item STORE DATA, the first data item ADDRESS, and the first data item BYTE ENABLE directly to the cache memory 102.

At a clock edge at the end of the first memory-stage cycle/start of a second memory-stage cycle, if one bit of the first data item VALID BIT is set to the valid state (e.g., the YES branch of decision block 602), then the first data item STORE DATA may be committed to the cache memory 102. At substantially the same time, an access to the cache memory 102 for the second data item CACHE TAGS and the memory management unit 104 for the second data item MMU ADDRESS may be performed for the second data item STORE DATA (e.g., block 606). At the clock edge at the end of the second memory-stage cycle, the second data item STORE DATA, the second data item ADDRESS, and the second data item BYTE ENABLE may also be stored in the store buffer 200 (e.g., block 608). The second data item VALID BIT associated with the second data item STORE DATA may be set in the store buffer 200 when available (e.g., block 610). The second data item STORE DATA may then remain in the store buffer 200 until a subsequent store instruction (e.g., block 612) initiates a subsequent memory-stage cycle.

At the clock edge at the beginning of the subsequent memory-stage cycle, the second data item VALID BIT is checked (e.g., decision block 614). If one bit of the second data item VALID BIT is set to the valid state (e.g., the YES branch of decision block 614), then the second data item STORE DATA buffered 15 in the store buffer 200 may be committed to the cache memory 102 (e.g., block 616). The above-described method may be repeated for additional back-to-back data items STORE DATA.

The present invention may be implemented by the preparation of ASICs, FPGAs, or by interconnecting an appropriate network of conventional components circuits that will be readily apparent to those skilled in the arts. While the invention has been particularly shown and described with reference to the preferred embodiments thereof, it will be understood by those skilled in the art that various changes in form and details may be made without departing from the spirit and scope of the invention.

What is claimed is:

1. A circuit comprising:

a cache memory configured as a plurality of associative sets;

a memory management unit configured to determine a data tag for an address of a data item during a cycle;

a logic circuit configured to (i) determine a selected set from said plurality of associative sets that produces a cache hit for said data tag, (ii) buffer said address and said data item during a said cycle as part of a first operation, (iii) present store said data item to said cache memory in said selected set during a subsequent cycle to said cycle as part of said first operation and (iv) present store said data item to said cache memory during said cycle as part of a second operation.

2. The circuit according to claim 1, wherein said logic circuit is further configured to buffer a second data item and a second address during said subsequent cycle.

3. The circuit according to claim 1, wherein said logic circuit is further configured to bypass buffering of said data item and said address as part of said second operation.

4. The circuit according to claim 1, wherein the logic circuit comprises:

a write enable logic configured to present a valid bit that identifies a selected set from said plurality of associative sets that produces a cache-hit for said data tag;

a plurality of registers configured to buffer said address, said data item, said valid bit and a byte enable;

a first plurality of multiplexers configured to (i) present said data item and said address to said cache memory, and (ii) present said valid bit and said byte enable to said write enable logic;

an address comparator configured to present a result of a comparison between said address said a second address;

a second plurality of multiplexers configured to present said data item external to said circuit as selected from said plurality of registers and said cache memory; and a bypass control logic configured to control said second plurality of multiplexers responsive to said result, said valid bit and said byte enable.

5. The circuit according to claim 1, wherein said memory management unit is configured to convert said address from a virtual address to a physical address.

6. The circuit according to claim 1, wherein said logic circuit is further configured to receive a second data item and a second address at a different interface than said data item and said address.

7. The circuit according to claim 3, wherein said logic circuit is further configured to compare said address buffered in said logic circuit with a second address in response to a load operation presenting said second address.

8. The circuit according to claim 7, wherein said logic circuit is further configured to present said data item as buffered external to said circuit in response to said address matching said second address.

9. A method comprising the steps of:
   (A) determining a data tag for an address of a data item during a cycle in response to a store operation;
   (B) determining a selected set from a plurality of associative sets of a cache memory that produces a cache-hit for said data tag;
   (C) buffering said data item and said address during a said cycle as part of a first operation;
   (D) storing said data item in said selected set during a subsequent cycle to said cycle as part of said first operation; and
   (E) storing said data item in said selected set during said cycle as part of a second operation.

10. The method according to claim 9, further comprising the step of:
    bypassing step (C) as part of said second operation.

11. The method according to claim 9, further comprising the step of: multiplexing between said data item and a second data item after step (C).

12. The method according to claim 9, further comprising the step of:
    buffering a second data item and a second address during said subsequent cycle in response to a second consecutive store operation.

13. The method according to claim 12, further comprising the step of:
    storing said second data item in said cache memory in response to storing said data item.

14. The method according to claim 9, further comprising steps of:
    comparing said address with a second address in response to a load operation presenting said second address.

15. The method according to claim 14, further comprising the step of:
    selecting between said data item as buffered and as stored in said cache memory for output in response to comparing said address with said second address.

16. A method comprising the steps of:
    (A) determining a data tag for an address of a data item during a cycle in response to a store operation;
    (B) determining a selected set from a plurality of associative sets of a cache memory that produces a cache-hit for said data tag;
    (C) storing said data item in said selected set during a said cycle; and
    (D) buffering a second data item and a second address during said cycle.

17. The method according to claim 16, further comprising the step of:
    storing said second data in said cache memory during a subsequent cycle to said cycle.

18. The method according to claim 17, further comprising the step of:
    comparing said second address with a third address in response to a load operation presenting said third address.

19. The method according to claim 18, further comprising the step of:
    selecting between said second data item as buffered and as stored in said cache memory for output in response to comparing said second address with said third address.

20. A circuit comprising:
    means for determining a data tag for an address of a data item during a cycle in response to a store operation;
    means for determining a selected set from a plurality of associative sets of a cache memory that produces a cache-hit for said data tag;
    means for buffering said data item and said address during a said cycle as part of a first operation; and
    means for storing said data item in said selected set (i) during a subsequent cycle to said cycle while operating as part of said first operation and (ii) during said cycle as part of a second operation.

* * * * *